Nov. 19, 1968     YOICHI MORI     3,411,382
FIVE STAGE AUTOMATIC SPEED CHANGE DEVICE
Filed May 24, 1967     4 Sheets-Sheet 1

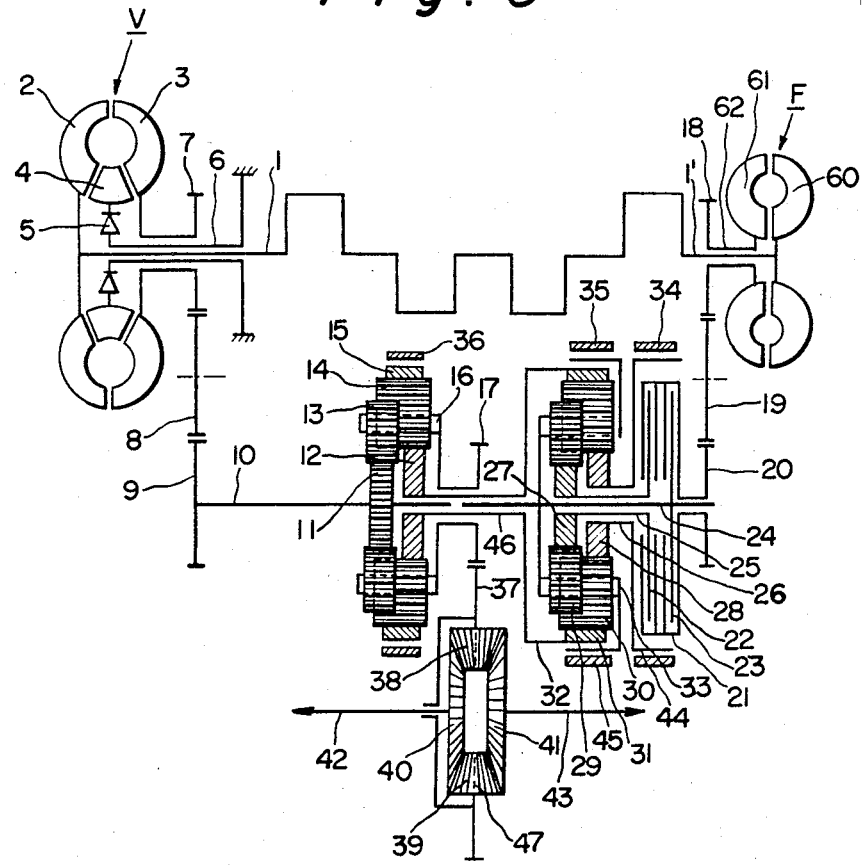

3,411,382
**FIVE STAGE AUTOMATIC SPEED
CHANGE DEVICE**
Yoichi Mori, Yokohama, Japan, assignor to Nissan
Jidosha Kabushiki Kaisha, Yokohama, Japan
Filed May 24, 1967, Ser. No. 640,887
Claims priority, application Japan, July 15, 1966,
41/45,962
11 Claims. (Cl. 74—688)

ABSTRACT OF THE DISCLOSURE

A five stage automatic speed change device, comprising a torque converter having a pump connected to an input shaft and a turbine, a first planetary gear assembly connected to said turbine through a suitable transmitting means, a second planetary gear assembly connected to said turbine or said pump through a suitable transmitting means including two clutches, an output gear connected to said first planetary gear assembly, and three brake means, thereby said output gear is driven in five stages by actuating said clutches in combination with said brakes in a suitable manner.

---

This invention relates to an automatic speed change device, more particularly to a 5-stage automatic speed change device capable of providing satisfactory speed change ratios, which comprises, in combination, an input shaft, a torque converter, so-called Ravigneaux type planetary gear assemblies, clutches, brakes, and an output shaft. As a feature of the present invention, use is made of a so-called Ravigneaux type planetary gear assembly, as disclosed in U.S. Patent No. 2,239,973 patented on Apr. 29, 1941, which comprises a first sun gear, a second sun gear, an internal gear, first planet gears meshed with said first sun gear, second planet gears engageably inserted between said second sun gear and said internal gear and meshed with said first planet gears, and a carrier pivotally supporting both said first and second planet gears.

In a preferred embodiment of the present invention, there are provided a pair of such Ravigneaux type planetary gear assemblies connected to an input shaft, e.g., an engine crankshaft, through two split transmission routes consisting of a first route including a torque converter and a second route, and an output shaft coupled with one of said planet gear assemblies.

An object of the present invention is to provide an automatic speed change device capable of changing forward speed in five stages and rearward speed in a single stage.

Another object of the invention is to provide an automatic speed change device having means for effecting, when operated at forward fifth stage, so-called over drive for revolving an output shaft thereof at a speed higher than that of an input shaft thereof.

For a better understanding of the invention, reference is made to the accompanying drawings, in which.

Figure 2:
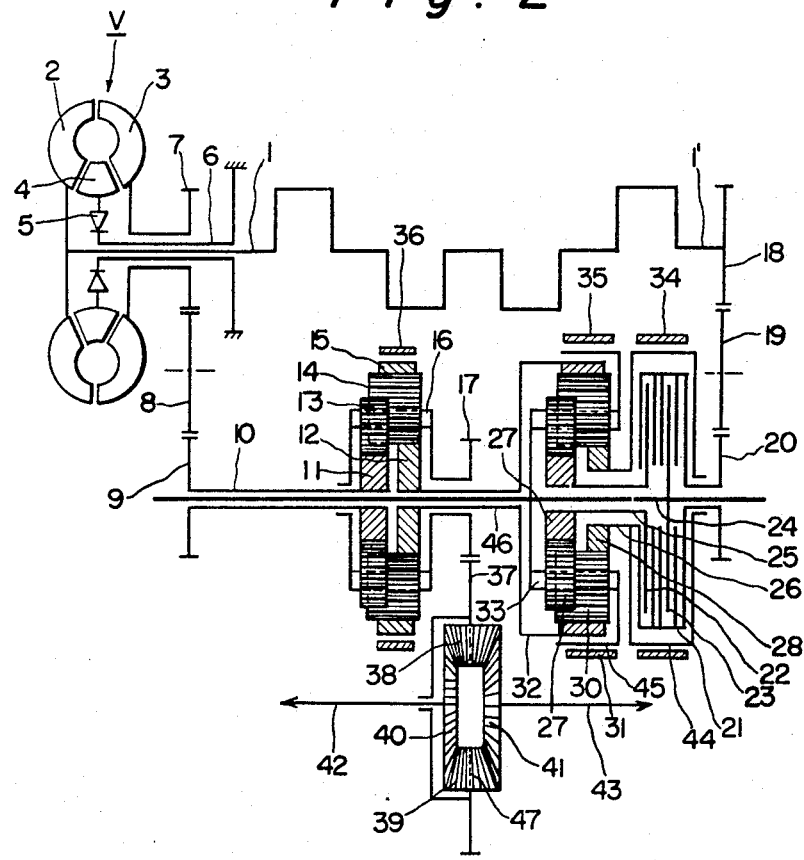
FIG. 2 is a view similar to FIG. 1, illustrating a second embodiment of the invention.
Figure 4:
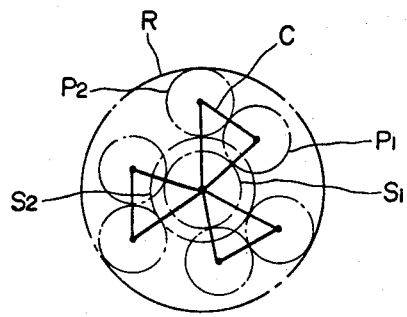

FIG. 4 is a diagrammatic illustration showing the manner in which various gear elements of a planetary gear assembly usable in the device of the invention are meshed with each other; and FIG. 5 is a skeleton diagram of a fourth embodiment of the present invention similar to the second embodiment as shown in FIG. 2, except addition of a fluid coupling mounted at one end of the engine crankshaft thereof.

The corresponding components of various embodiments are represented by the same reference numerals and symbols throughout the drawings.

Figure 1:
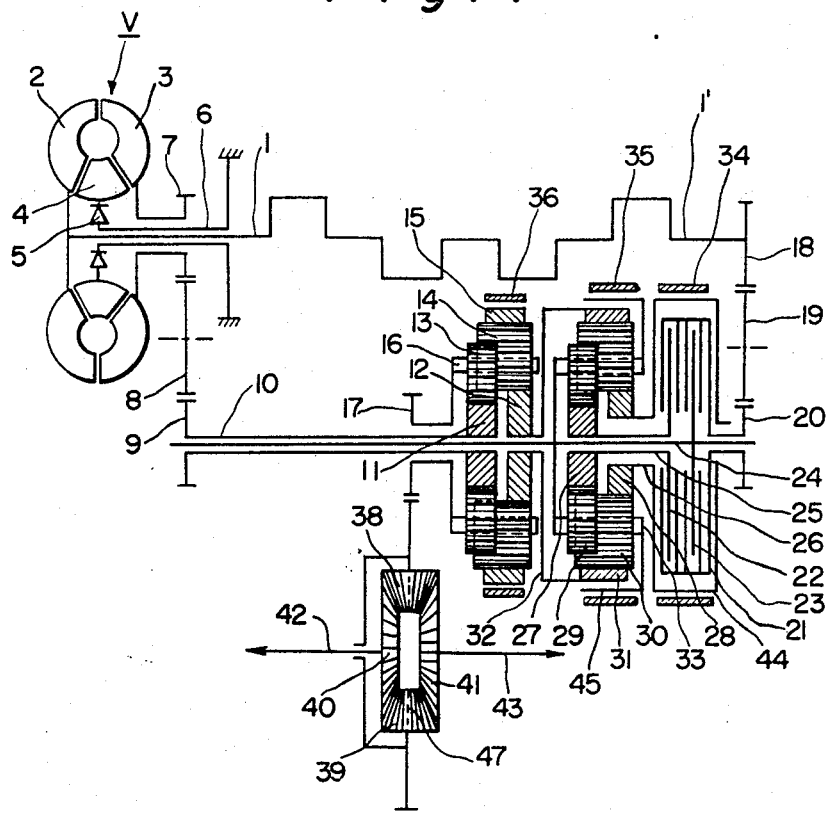
FIG. 1 is a skeleton diagram of an automatic speed change device embodying the present invention.

Referring to FIG. 1 illustrating a first embodiment of the automatic speed change device according to the present invention, a torque converter V, which is connected to the left hand end of the engine crankshaft 1 acting as an input shaft of the speed change device, comprises a pump 2 secured directly to the left end of the crankshaft 1, FIG. 1, a turbine 3, a stator 4 engageable with a one-way brake 5 mounted on a stationary sleeve 6 secured to the casing of the speed change device. The outer periphery of the one-way brake 5 is secured to the stator 4, while the inner periphery thereof is secured to the stationary sleeve 6, and the one-way brake is adapted to allow rotation of the stator 4 in a normal direction, but not in the opposite direction. What is meant by the "normal direction" here is the direction in which the crankshaft 1 and accordingly the pump 2 rotate.

A transmission gear 7 secured to the turbine 3 is meshed with an intermediate transmission gear 8, which is in turn meshed with another transmission gear 9 integrally secured to a hollow shaft 10.

A first planetary gear assembly comprises a first sun gear 11, a second sun gear 12, first planet gears 13, second planet gears 14, an internal gear 15, and a carrier 16 to carry said first and second planet gears. FIG. 4 illustrates the manner in which various gears of the first planetary gear assembly are meshed with each other. The first sun gear 11 is bonded to the hollow shaft 10. An output gear 17 is connected to the carrier 16 so as to rotate around the hollow shaft 10.

A transmission gear 18 is mounted to the right hand end of the crankshaft 1, FIG. 1, and meshed with an intermediate transmission gear 19, which is in turn meshed with another transmission gear 20 integrally connected to a clutch body 21. The clutch body 21 is engageable with a first clutch plate 22 to form a first clutch 21, 22 and with a second clutch plate 23 to form a second clutch 21, 23. The first clutch plate 22 is connected to another hollow shaft 25, while the second clutch plate 23 is connected to a transmission shaft 24.

A second planetary gear assembly comprises a first sun gear 27, a second sun gear 28, first planet gears 29, second planet gears 30, an internal gear 31, and a carrier 33. The manner in which various gears of the second planetary gear assembly are meshed with each other is identical with that of the first planetary gear assembly, as illustrated in FIG. 4. The first sun gear 27 is connected to said hollow shaft 25, while the carrier 33 is bonded to said transmission shaft 24.

The internal gear 31 of the second planetary gear assembly is connected to the second sun gear 12 of the first planetary gear assembly through a connector 32. A brake drum 44 is integrally connected to the second sun gear 28 of the second planetary gear assembly, while another brake drum 45 is integrally connected to the carrier 33 of the second planetary gear assembly. A first brake 35, when actuated, stops the aforesaid other brake drum 45; a second brake 34, when actuated, stops aforesaid brake drum 44; and a third brake 36, when actuated stops the internal gear 15 of the first planetary gear assembly.

A reduction gear wheel 37 is meshed with the ouput gear 17 and carries a differential gear means having a pair of bevel pinions 38, 39 and a pair of side gears 40, 41. The bevel pinions 38, 39 revolve around a shaft means 47 secured to the reduction gear wheel 37. The side gears 40, 41 are driven by the bevel pinions 38, 39. Under the condition of differential operation, the side gears are rotated at different revolving speeds. Wheels (not shown) of a vehicle on which the speed change device is mounted are driven by the side gears 40, 41 through axles 42, 43.

In the speed change device of FIG. 1, when the crankshaft 1 is rotated upon actuation of the engine, the power on the chankshaft 1 is transferred to the planetary gear assemblies through two routes; namely, a first route from one end of the crankshaft 1 to the first sun gear 11 of the first planetary gear assembly through the pump 2 and the turbine 3 of the torque converter V, the transmission gears 7, 8, 9, and the hollow shaft 10; and a second route from the opposite end of the crankshaft 1 to the second planetary gear assembly through the transmission gears 18, 19, 20, and the clutch body 21, which clutch body is engageable with one or both of the first sun gear 27 and the carrier 33 of the second planetary gear assembly by selectively engaging the first clutch 21, 22 and the second clutch 21, 23. Since the first and second planetary gear assemblies are connected to each other through the connector 32, the powers through said two routes are synthesized by the planetary gear assemblies, and the output power thus synthesized is delivered to the output gear 17 by way of the carrier 16 of the first planetary gear assembly. The output power is used to drive the wheels of the vehicle through the reduction gear wheel 37 and the differential gear means, as described in the foregoing.

The speed change device of the present invention can be operated automatically in five forward stages and a single rearward stage by controlling various clutches in conjunction with brakes by means of a suitable hydraulic device (not shown). Before entering into detailed description of power transmission routes in each operative stage, reduction ratios and relations between revolving speeds of various rotary gears of the planetary gear assemblies will now be described. What is meant by the "reduction ratio" here is a per-unit value of the revolving speed of the crankshaft 1 based on the revolving speed of the output gear 17. For accurate determination of such reduction ratios, it is necessary to evaluate and consider the sliding speed (slip) in the torque converter or the hydraulic coupling inserted between the crankshaft 1 and the output gear 17. However, in this particular embodiment of the invention, it is assumed that the transmission gears 9 and 20 are rotated at the same revolving speed as the crankshaft 1, and the reduction ratio $m$ in the following description is based on such assumption.

In the first planetary gear assembly, if the revolving speeds of the first sun gear 11, the second sun gear 12, the internal gear 15, and the carrier 16 are represented by $S_1$, $S_2$, $R$, and $C$ respectively, then the reduction ratio $m$ is given by the following formula:

$$m = S_1/C \qquad (1)$$

Here, the first sun gear 11 is assumed to revolve at the same speed as the crankshaft 1 by the power delivered through the turbine 3 of the torque converter, transmission gears 7, 8, 9, and the hollow shaft 10, as described hereinbefore. There are the following relations between $S_1$, $S_2$, $R$, and $C$:

$$(l_S + 1)C = l_S S_2 + S_1 \qquad (2)$$

$$(l_R - 1)C = l_R R - S_1 \qquad (3)$$

Here, $l_S$ and $l_R$ are per-unit values of the pitch circle radii of the second sun gear 12 and the internal gear 15, respectively, based on the pitch circle radius of the first sun gear 11. In example to be described hereinafter referring to Table 1, it will be assumed that $l_S = 1.25$ and $l_R = 2.92$. One can obtain the following relationship from the Formulae 1 and 2:

$$m = \frac{1 + l_S}{1 + l_S(S_2/S_1)} \qquad (4)$$

It is apparent from the Formula 4 that the reduction ratio $m$ is a function of $S_2/S_1$.

The relation between various rotary gears of the second planetary gear assembly will now be described, because the second sun gear 12 of the first planetary gear assembly revolving at the speed of $S_2$ is connected to the internal gear 31 of the second planetary gear assembly. In the second planetary gear assembly, if it is assumed that the revolving speeds of the first sun gear 27, the second sun gear 28, the internal gear 31, and the carrier 33 are represented by $S_1'$, $S_2'$, $R'$, and $C'$, respectively, then there are following relations between such revolving speeds:

$$(l_S + 1)C' = l_S S_2' + S_1' \qquad (5)$$

$$(l_R - 1)C' = l_R R' - S_1' \qquad (6)$$

Here, $l_S'$ and $l_R'$ are per-unit values of the pitch circle radii of the second sun gear 28 and the internal gear 31 based on the pitch circle radius of the first sun gear 27. For simplicity, in the Formulae 5 and 6, the numerical values of such pitch circle radii in per-unit are assumed to be identical with those of the first planetary gear assembly; namely, it was assumed that $l_S' = l_S$ and $l_R' = l_R$.

In the particular embodiment of FIG. 1, the relation of $R' = S_2$ is satisfied, and hence, the Formula 6 can be re-written as follows:

$$(l_R - 1)C' = l_R S_2 - S_1' \qquad (6')$$

The reduction ratio for each stage of operation can be determined by setting the revolving speeds of stationary members as zero in the aforesaid formulae.

The operation of the speed change device of FIG. 1 in each operative stage will now be described in detail.

*Forward first stage*

The first brake 35 and the second brake 34 are actuated. The power on the turbine 3 of the torque converter V is transmitted to the first sun gear 11 of the first planetary gear assembly through the transmission gears 7, 8, 9, and the hollow shaft 10. On the other hand, both the carrier 33 and the second sun gear 28 of the second planetary gear assembly are held stationary, and hence, the entire second planetary gear assembly is kept stationary. Thus, the second sun gear 12 of the first planetary gear assembly is also held stationary.

By setting $S_2 = 0$ in the Formula 4, the reduction ratio for the forward first stage can be determined as follows:

$$m = 1 + l_S = 2.25$$

Under these conditions, the transmission gears 18 to 20 and the clutch body 21 rotate idly.

*Forward second stage*

The first clutch 21, 22 is engaged and the first brake 35 is actuated. Then, the power on the turbine 3 is transmitted to the first sun gear 11 of the first planetary gear assembly, as in the preceding forward first stage, and at the same time, the power on the right hand end of the crankshaft 1, FIG. 1, is transmitted to the first sun gear 27 of the second planetary gear assembly through the transmission gears 18 to 20, the first clutch 21, 22, and the hollow shaft 25. On the other hand, the carrier 33 of the second planetary gear assembly is kept stationary. By setting $C' = 0$ and $S_1' = S_1$ in the Formula 6', one obtains the relation of $S_2/S_1 = 1/l_R$. By substituting this relation to the Formula 4, the reduction ratio $m$ for the forward second stage can be determined as follows:

$$m = \frac{1 + l_S}{1 + l_S(1/l_R)} = 1.575$$

*Forward third stage*

The first clutch 21, 22 is engaged and the second brake 34 is actuated. Then, the power on the torque converter turbine 3 and the power on the right hand end of the crankshaft 1, FIG. 1, are transmitted to the first sun gear 11 of the first planetary gear assembly and to the first sun gear 27 of the second planetary gear assembly, respectively. On the other hand, the second sun gear 28 of the second planetary gear assembly is held stationary. By setting $S_2'=0$ and $S_1'=S_1$ in the Formulae 5 and 6', one obtains the relation of $$S_2/S_1=\frac{l_R+l_S}{l_R(l_S+1)}$$

By substituting this relation to the Formula 4, the reduction ratio $m$ for the forward third stage can be determined as follows:

$$m=\frac{1+l_S}{1+\frac{l_S}{l_R}\left(\frac{l_S+l_R}{l_S+1}\right)}=1.252$$

Forward fourth stage

The first clutch 21, 22 is engaged and the second clutch 21, 23 is also engaged. Then, the power on the torque converter turbine 3 and the power on the right hand end of the crankshaft 1, FIG. 1, are transmitted to the first sun gear 11 of the first planetary gear assembly and to the first sun gear 27 of the second planetary gear assembly, respectively, as in the preceding forward third stage. At the same time, the power on the right hand end of the crankshaft 1 is also transmitted to the carrier 33 of the second planetary gear assembly through the second clutch 21, 23. Under these conditions, all the rotary members of the second planetary gear assembly are rotated together as if they were a single body. The second sun gear 12 of the first planetary gear assembly, which is connected to the internal gear 31 of the first planetary gear assembly, is also rotated at the same speed as the entire second planetary gear assembly. Therefore, $S_1'=S_2$ and $S_1=S_1'$, and in the Formula 4, the reduction ratio for the forward fourth stage becomes unity, i.e., $m=1$.

Forward fifth stage

The second clutch 21, 23 is engaged and the second brake 34 is actuated. Then, the power on the turbine 3 is transmitted to the first sun gear 11 of the first planetary gear assembly, while the power on the right hand end of the crankshaft 1, FIG. 1, is transmitted to the carrier 33 of the second planetary gear assembly through the second clutch 21, 23. On the other hand, the second sun gear 28 of the second planetary gear assembly is held stationary by the second brake 34. By setting $S_2'=0$ and $C_2=S_1$ in the Formulae 5 and 6', one obtains the following relation:

$$S_2/S_1=l_S/l_R+1$$

By substituting this relation to the Formula 4, the reduction ratio $m$ for the forward fifth stage can be determined as follows:

$$m=\frac{1+l_S}{1+l_S(l_S/l_R+1)}=0.826$$

In other words, the speed change device of FIG. 1 is in so-called over-drive conditions in this operative stage; i.e. the output gear 17 is rotated faster than the crankshaft 1.

Rearward stage

The third brake 36 is actuated. Then, the power on the turbine 3 is transmitted to the first sun gear 11 of the first planetary gear assembly, while the internal gear 15 of the same planetary gear assembly is held stationary. By setting $R=0$ in the Formula 3, the reduction ratio $m$ for the rearward stage can be determined as follows.

$$m=S_1/C=-(l_R-1)=-1.92$$

In other words, the output gear is rotated at a reduced speed in a reversed or rearward direction.

Table 1 shows operative conditions of various clutches and brakes of the speed change device of FIG. 1 in each operative stage thereof together with the reduction ratios therefor.

TABLE 1

| Operative stages | First clutch (21,22) | Second clutch (21,23) | Second brake (34) | First brake (35) | Third brake (36) | Example of reduction ratio $(m)$[1] |
|---|---|---|---|---|---|---|
| Forward 1st | Disengaged | Disengaged | Actuated | Actuated | Released | 2.25 |
| Forward 2nd | Engaged | do | Released | do | do | 1.575 |
| Forward 3rd | do | do | Actuated | Released | do | 1.252 |
| Forward 4th | do | Engaged | Released | do | do | 1.00 |
| Forward 5th | Disengaged | do | Actuated | do | do | 0.826 |
| Rearward | do | Disengaged | Released | do | Actuated | −1.92 |

[1] The example is based on the assumption that $l_S=1.25$ and $l_R=2.92$.

FIG. 2 shows a second embodiment of the present invention, in which an output gear 17 is located between first and second planetary gear assemblies, instead of to the left of the planetary gear assemblies in the case of the preceding first embodiment, described hereinbefore referring to FIG. 1. In the second embodiment, an additional hollow shaft 46 is provided to connect a second sun gear 12 of the first planetary gear assembly with an internal gear 31 of the second planetary gear assembly, in a manner similar to the connector 32 of the preceding first embodiment. The output gear 17 of the second embodiment is also connected to a carrier 16 of the first planetary gear assembly and adapted to rotate around the hollow shaft 46. The second embodiment differs from the preceding first embodiment only in the aforesaid position of the output gear 17 and it is apparent to those skilled in the art that the power transmission routes and the reduction ratios in each operative stage of the second embodiment of the invention are identical with those of the first embodiment described in detail hereinbefore.

Both the first and the second embodiment of the present invention are suitable for a vehicle having a laterally disposed engine, which vehicle is of front-engine front-drive type or rear-engine rear-drive type. What is meant by "a laterally disposed engine" here is an engine disposed at right angles to the longitudinal direction of the vehicle. The position of the output gear can be determined so as to suit particular construction and disposition of a vehicle on which the speed change device is mounted.

Figure 3:
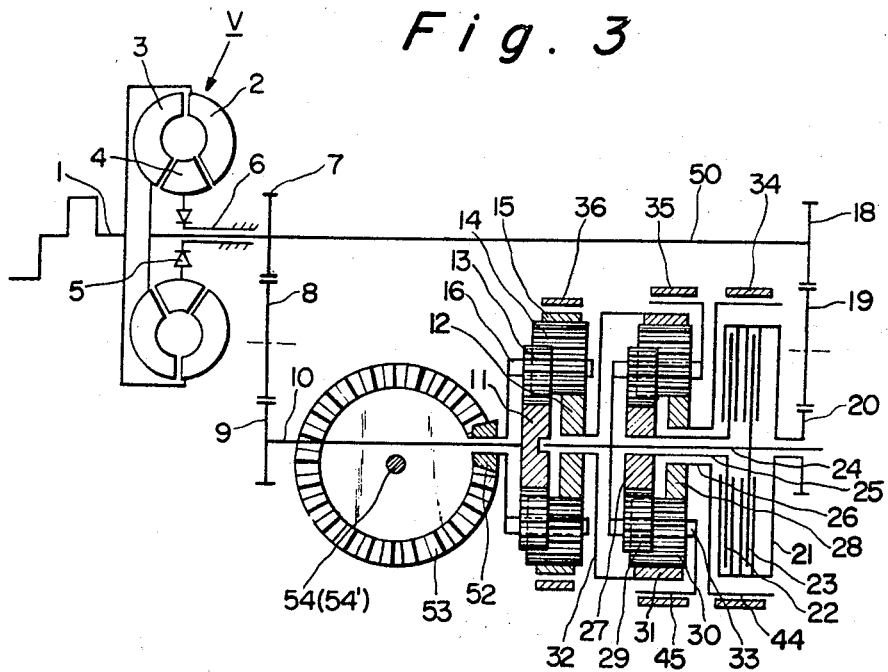
FIG. 3 is a skeleton diagram of a third embodiment of the present invention.

FIG. 3 shows a third embodiment of the present invention, in which an input system to the speed change device and an output system therefrom are different from the corresponding components of the preceding first embodiment described hereinbefore referring to FIG. 1, while the remaining parts thereof, such as the construction and interconnection of two Ravigneaux type planetary gear assemblies and the arrangement of clutches and brakes, are identical with those of the aforesaid first embodiment. In the third embodiment, a long spindle 50 is formed by extending the shaft of a turbine 3 of a torque converter V mounted at the right hand end of an engine crankshaft 1, FIG. 3. The power on the turbine 3 is transmitted to the planetary gear assemblies through two routes; namely a first route consisting of a transmission gear 7 mounted on the long spindle 50 at a point close to the torque converter V, cooperating transmission gears 8, 9, a transmission shaft 10 integrally connected to a first sun gear 11 of a first planetary gear assembly; and a second route consisting of another transmission gear 18 mounted on the long spindle 50 at a point away from the torque converter V, cooperating transmission gears 19, 20, and a clutch body 21. The output gear 17 of the first embodiment of FIG. 1 is replaced by a hypoid pinion 52, and the output power on the hypoid pinion 52 is transferred to both side axles 54 and 54' through a hypoid gear wheel 53 and a differential gear means (not shown). Thus, the axles are disposed at right angles to the crankshaft or to the axis of planetary gear assemblies, and accordingly, this embodiment is suitable for a vehicle having a laterally disposed engine.

In the third embodiment of the invention, as shown in FIG. 3, the power transmission routes are essentially identical with those of the first embodiment of FIG. 1, despite the aforesaid modifications in the mechanical structure; namely, the output power of an engine appearing on the crankshaft 1 is split and delivered to both the first sun gear 11 and the clutch body 21 through the two routes described hereinbefore, and then synthesized by the first and second planetary gear assemblies to generate output power to an output gear (a hypoid pinion 52 in this third embodiment). Therefore, the power passageway and reduction ratios in each stage of operation of the third embodiment is identical with those of the first embodiment, and Table 1 is also applicable to this third embodiment without any modification.

As a feature of the third embodiment, the power on the turbine 3 of the torque converter V is split and delivered to both the gear series 7, 8, and 9 and the other gear series 18, 19, and 20.

The third embodiment of the invention is suitable for a vehicle having a longitudinally disposed engine, which vehicle is of front-engine front-drive type, front-engine rear-drive type, rear-engine front-drive type, or rear-engine rear-drive type.

In each of the preceding embodiments, a power transmission route issuing from the right hand end of the crankshaft or the long spindle, i.e. a route through the transmission gears 18, 19, and 20, includes a first clutch 21, 22 and a second clutch 21, 23. In certain applications, when one of such clutches is engaged, the output means of the speed change device, e.g. the output gear 17 of FIGS. 1 and 2 or the hypoid pinion 52 of FIG. 3, is possibly subjected to a sudden speed change causing a mechanical shock. Such shock due to quick speed change can be eliminated by inserting a fluid coupling F in the aforesaid second transmission route. FIG. 5 shows an example of such fluid coupling F used in the second embodiment of FIG. 2; however, it should be understood that any of the preceding embodiments is readily adaptable for incorporating the fluid coupling F therein.

Referring to FIG. 5, illustrating a skeleton diagram of a speed change device similar to the second embodiment of FIG. 2 except a fluid coupling F inserted between a crankshaft 1 and a transmission gear 18. The fluid coupling F includes a pump 60 connected to the extreme right hand end of the crankshaft 1, FIG. 5, and a turbine 61 secured to the transmission gear 18 through a hollow shaft 62.

During the forward first stage of operation, first and second brakes 35, 34 are actuated to keep all the rotary members of a second planetary gear assembly stationary, and accordingly first and second clutch plates 22 and 23 are also kept stationary. Under these conditions, the turbine 61 is rotated at the same speed as the pump 60 and the crankshaft 1, while transmission gears 18 to 20 and a clutch body 21 revolve idly.

For shifting from the forward first stage to the forward second stage, the first clutch 21, 22 is engaged. Since a first sun gear 27 connected to the clutch plate 22 is kept stationary prior to the shift, upon the above shifting, all the rotary members between the turbine 61 and the clutch body 21 are going to be slowed down quickly. If there should not be a fluid coupling, the crankshaft 1 is also going to be slowed down by the inertia of aforesaid rotary members and clutch body connected to the right hand end thereof, FIG. 2; however, due to the comparatively large mass of the crankshaft 1, the crankshaft itself is not slowed down and considerably large shock is applied to the output gear 17. On the other hand, if there is provided a fluid coupling F, as shown in FIG. 5, the quick speed change of the rotary members between the clutch body 21 and the turbine 61 is absorbed by the slip of the fluid turbine F. In other words, the mass affecting the mechanical shock on the output gear at the time of said shifting is limited to those of the rotary members between the turbine 61 and the clutch body 21.

As described in the foregoing, according to the present invention, there is provided an automatic speed change device comprising a casing; an input shaft means rotatable only in the normal direction; first and second planetary gear assemblies each including first and second sun gears, an internal gear, a plurality of first planet gears meshed with said first sun gear, a plurality of second planet gears meshed with said second sun gear as well as said internal gear and said first planet gears, and a carrier carrying said first and second planet gears; said first planetary gear assembly being aligned with said second planetary gear assembly, and said second sun gear of said first planetary gear assembly being connected to said internal gear of said second planetary gear assembly; a torque converter consisting of a pump connected to said input shaft means, a turbine driven by said pump, and a stator supported by a stationary sleeve integrally formed on said casing; a first and a second clutch means having a common clutch body, said first clutch means being capable of making said common clutch body engage with said first sun gear of said second planetary gear assembly, while said second clutch means being capable of making said common clutch body engage with said carrier of said second planetary gear assembly; first and second power transmission routes for transmitting the power on said input shaft to said first and second planetary gear assemblies respectively, said first power transmission route extending from said turbine of said torque converter to said first sun gear of said first planetary gear assembly through a series of transmission gears, with said second transmission route extending from said input shaft means to said second planetary gear assembly through another series of transmission gears and said first and second clutch means; a first brake capable of stopping said carrier of said second planetary gear assembly, a second brake capable of stopping said second sun gear of said second planetary gear assembly, and a third brake capable of stopping said internal gear of said first planetary gear assembly; and an output gear secured to said carrier of said first planetary gear assembly.

As illustrated in the aforesaid embodiments, the two split power transmission routes can be made in either one of the following two ways; namely, two routes consisting of a route including a torque converter and another route not including a torque converter, as shown in FIGS. 1, 2, and 5; or two routes each receiving power from an input shaft through a torque converter, as shown in FIG. 3.

Moreover, in the aforementioned process of determining speed change ratios referring to the first embodiment, it has been assumed for simplicity that $$l_S = l_S' \text{ and } l_R = l_R'$$

however, such assumption is not absolutely necessary. It is possible to obtain any desired speed change ratios by assuming $l_S \neq l_S'$ and $l_R \neq l_R'$.

What I claim is:

1. A five stage automatic speed change device comprising a casing; an input shaft means rotatable only in a normal direction; first and second planetary gear assemblies each including first and second sun gears, an internal gear, a plurality of first planet gears meshed with said first sun gear, a plurality of second planet gears meshed with said second sun gear as well as said internal gear and said first planet gears, and a carrier carrying said first and second planet gears; said first planetary gear assembly being aligned with said second planetary gear assembly, and said second sun gear of said first planetary gear assembly being connected to said internal gear of said second planetary gear assembly; a torque converter consisting of a pump connected to said input shaft means, a turbine driven by said pump, and a stator supported by a stationary sleeve integrally formed on said casing; a first and a second clutch means having a common clutch body, said first clutch means being capable of making said common clutch body engage with said first sun gear of said second planetary gear assembly, while said second clutch means being capable of making said common clutch body engage with said carrier of said second planetary gear assembly; first and second power transmission routes for transmitting the power on said input shaft to said first and second planetary gear assemblies respectively, said first power transmission route extending from said turbine of said torque converter to said first sun gear of said first planetary gear assembly through a series of transmission gears, while said second transmission route extending from said input shaft means to said second planetary gear assembly through another series of transmission gears and said first and second clutch means; a first brake capable of stopping said carrier of said second planetary gear assembly, a second brake capable of stopping said second sun gear of said second planetary gear assembly, and a third brake capable of stopping said internal gear of said first planetary gear assembly; and an output gear secured to said carrier of said first planetary gear assembly.

2. A speed change device according to claim 1, wherein said input shaft means is an engine crankshaft, and one end of the crankshaft is connected to said pump of said torque converter, while the opposite end of said crankshaft is connected to said second transmission route.

3. A speed change device according to claim 1, wherein said first and second planetary gear assemblies and said first and second clutches are aligned with each other and disposed in parallel with said input shaft means.

4. A speed change device according to claim 1, wherein said first and second brakes are actuated to operate the speed change device at a forward first stage; said first clutch is engaged and said first brake is actuated to operate said speed change device at a forward second stage; said first clutch is engaged and said second brake is actuated to operate the speed change device at a forward third stage; said first and second clutches are engaged to operate said speed change device at a forward fourth stage; said second clutch is engaged and said second brake is actuated to operate the speed change device at a forward fourth stage; said second clutch is engaged and said second brake is actuated to operate the speed change device at a forward fifth stage; and said third brake is actuated to operate the speed change device at a rearward stage.

5. A speed change device according to claim 1, wherein said first and said second planetary gear assemblies include at least three first planet gears.

6. A speed change device according to claim 4, wherein said output gear is rotated at a higher revolving speed than said input shaft during said forward fifth stage of operation.

7. A speed change device according to claim 1, wherein said output gear is extended from said first planetary gear assembly toward said torque converter.

8. A speed change device according to claim 1, wherein said output gear is extended from said first planetary gear assembly toward said second planetary gear assembly.

9. A speed change device according to claim 1 and further comprising a long spindle connected to said turbine of said torque converter while being aligned with said input shaft means, wherein said second transmission route is connected to said long spindle.

10. A speed change device according to claim 1, wherein said output gear is a bevel pinion meshed with a bevel gear wheel secured to vehicle axles.

11. A speed change device according to claim 1, wherein said second route is connected to said input shaft means through a fluid coupling including a pump secured to said input shaft means and a turbine secured to one of said transmission gears of said second route.

References Cited

UNITED STATES PATENTS

| | | | |
|---|---|---|---|
| 643,130 | 2/1900 | Heermans | 74—695 |
| 1,125,140 | 1/1915 | Lucke | 74—701 X |
| 2,725,762 | 12/1955 | Hettinger et al. | 74—688 |
| 2,919,604 | 1/1960 | De Lorean | 74—688 X |
| 3,025,721 | 3/1962 | De Lorean | 74—688 |
| 3,029,662 | 4/1962 | Hause | 74—695 |
| 3,209,617 | 10/1965 | Kalversberg | 74—688 |
| 3,246,542 | 4/1966 | Moan | 74—688 X |
| 3,270,585 | 9/1966 | Livezey | 74—688 X |
| 3,300,001 | 1/1967 | Stockton | 74—763 X |
| 3,314.307 | 4/1967 | Egbert | 74—688 |

ARTHUR T. McKEON, *Primary Examiner.*